Nov. 16, 1943.  E. A. RICHARDS  2,334,289
ARRANGEMENT FOR CHARGING SECONDARY ELECTRIC BATTERIES
Filed April 9, 1942
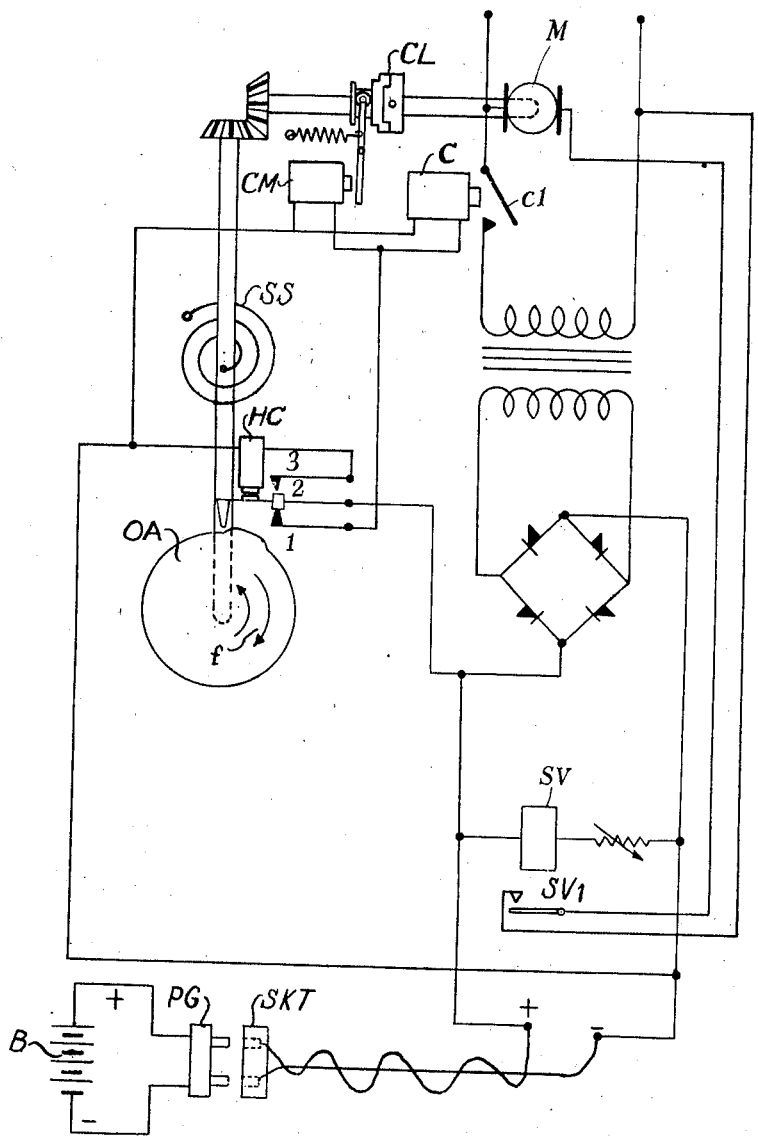
INVENTOR
E. A. Richards
BY
R. P. Morris
ATTORNEY Patented Nov. 16, 1943

2,334,289

UNITED STATES PATENT OFFICE 2,334,289

ARRANGEMENT FOR CHARGING SECONDARY ELECTRIC BATTERIES

Edward Arthur Richards, London, England, assignor to International Standard Electric Corporation, New York, N. Y.

Application April 9, 1942, Serial No. 438,294
In Great Britain April 30, 1941

5 Claims. (Cl. 320—34)

This invention relates to arrangements for charging secondary electric batteries.

An object of the present invention is to make the action entirely dependent upon the fact that the battery is connected to the charger.

In accordance with the invention, an initial charging is determined by a device responsive to the battery voltage and a subsequent charging is determined by a chronometric device.

In accordance with a further feature of the invention, an arrangement for charging batteries comprises a relay which is operated by the plugging in of a battery and which when operative connects a charging supply to the battery; a relay which is operated by the rise of the battery-voltage to a predetermined value and which when operative connects a supply to an electrically-driven chronometric means; and normally closed contacts in the circuit of said first-mentioned relay which are opened by the chronometric means after a predetermined time elapse; so that the manipulation necessary by an operator is reduced to simply plugging in the battery.

One form of the invention is shown in the accompanying drawing, and its operation is as follows:

The circuit being in its normal condition in which the contact positions are as shown in the diagram, the battery plug PG on the vehicle is connected by means of the socket SKT to the charger. Current then flows from the battery B, over contacts 2 and 1, the contactor relay coil C and the clutch magnet CM in parallel. The contactor relay coil C, being energised, closes the contact CI and connects the A. C. supply to the input side of the transformer, so commencing the charge of the battery. Clutch magnet CM, being operated, mechanically connects by means of clutch CL the shaft of the synchronous motor M in the manner shown to another shaft on which is mounted an operating arm or cam OA and a spiral return spring SS. The synchronous motor does not rotate at this time because its contacts are open at SVI. When the battery voltage has risen to 2.35 volts per cell, the relay SV operates and at SVI closes the circuit of the synchronous motor M. The synchronous motor now commences to rotate and drives the operating arm OA in the direction of the arrow $f$ until it reaches the point at which it changes over the contact 2 from connection with contact 1 to connection with contact 3. The time which is necessary in order to achieve this movement obviously depends on the initial setting of the arm which can be varied at will to suit the requirements of any particular battery. When connection is broken between the contacts 2 and 1 the circuit of the contactor and the clutch magnet is opened. The clutch disengages, releasing the shaft carrying arm OA which returns to its initial position under the action of the return spring SS, and the release of the contactor relay C opens at its contacts CI the A. C. circuit to the transformer and so stops the charge. At contacts 2 and 3 the locking circuit of a holding coil HC is completed, which maintains the contacts 2 and 3 in engagement independently of cam OA. They are thus held as long as the battery plug remains in the socket, whereas the other elements of the control circuit have already returned to the starting point. Soon after the charging circuit is interrupted at contact CI the voltage of the battery will fall to a value less than 2.35 volts per cell and the relay SV will open its contact and so stop the operation of the synchronous motor. It will be appreciated that it is of no importance if the synchronous motor continues to run for a few seconds after the contact CI has been opened, because the clutch is now released and there is therefore no mechanical connection between the motor and the operating arm. Whenever the battery plug is withdrawn from the socket the holding coil HC is de-energised and the contacts return to normal.

What is claimed is:

1. A circuit arrangement for charging secondary batteries comprising means for connecting a battery to be charged to said circuit, a clutch magnet and a relay in said circuit operable in response to the connection of a battery to said circuit, a source of alternating current, a transformer having its primary connected across said source through the front contacts of said relay, a rectifier in the secondary circuit of said transformer having its direct current terminals connected to the battery to be charged, a second relay connected across said direct current terminals operable responsive to a predetermined voltage condition of said battery, a motor controlled by the contacts of said second relay adapted to start when said second relay operates, a cam, a clutch controlled by said clutch magnet arranged to connect the shaft of said motor to said cam when said clutch magnet is energized, contact means operable by said cam for opening the energizing circuit for said clutch magnet and the first mentioned relay thereby disconnecting the primary circuit of said transformer, and means for holding said contacts in operated position irrespective of the position of said cam.

2. A circuit arrangement for charging secondary batteries comprising means for plugging into said circuit a battery to be charged, a clutch magnet and a relay in said circuit operable by current from the battery to be charged, a source of alternating current, a transformer, a circuit controlled by said relay when operated for connecting the primary of said transformer across said source, a rectifier circuit fed from the secondary of said transformer having its direct current terminals connected to the battery to be charged, a relay adapted to operate in response to a predetermined voltage level of said battery connected across said direct current terminals, a motor connected through the contacts of said relay when operated to said source of alternating current, a shaft having a contact operating cam mounted thereon, a clutch connecting said shaft to the shaft of the motor adapted to be engaged by said clutch magnet when the latter is energized, normally closed contact means disposed so as to be opened by said cam when rotated a predetermined distance by said motor, said contacts being connected in the circuit for energizing said clutch magnet and the first mentioned relay, whereby on the opening of said contacts, the motor is stopped and the clutch disengaged.

3. A circuit arrangement according to claim 2 wherein a spring is provided to return the cam to a normal position when the clutch is disengaged.

4. A circuit arrangement according to claim 2 wherein means are provided for holding said contacts open irrespective of the position of the cam.

5. A circuit arrangement according to claim 2 wherein means are provided for holding said contacts open said means comprising a holding coil having a locking circuit closed by said cam, said locking circuit being energized by the battery connected to the charging circuit.

EDWARD ARTHUR RICHARDS.